EXAMINER.

Stoves, F
Liquid

BEST AVAILABLE COPY

W. F. Shaw,

Gas Heater

No. 149. Fig 1 (A.I.) Patented July 22. 1856.

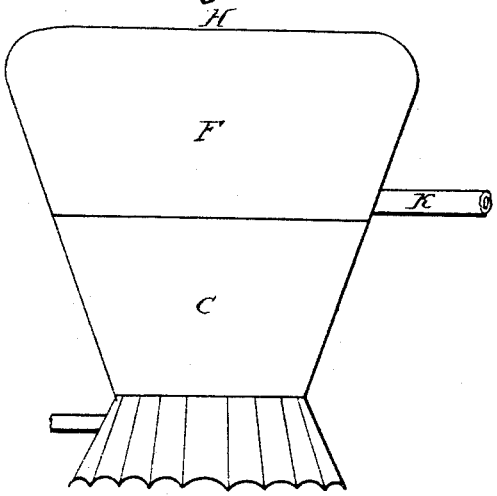

Fig 2

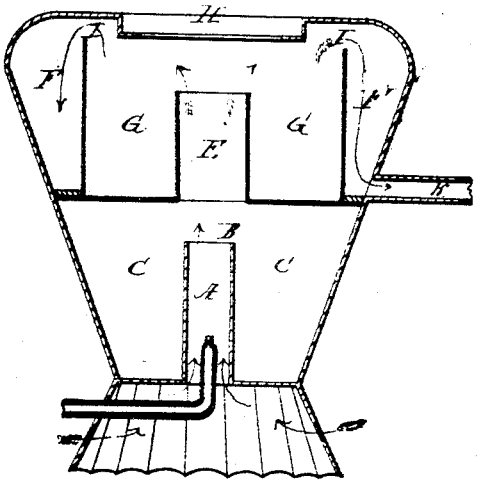

No. 149, to original Letters Patent No. 12,267.—*Improved Gas Heater.*

I *claim* the arrangement therein in manner as described of a separate or boiling chamber G, that is, to or between the flue-pipe E and the *c d e*, whereby the swivelled breech is caused to rotate from left to right and from right to left in locking and unlocking said breech, and whereby the breech is also moved back and forth, substantially as

H. PETERS, PHOTO-LITHOGRAPHER, WASHINGTON, D. C.